United States Patent

[11] 3,533,507

| [72] | Inventor | Robert William Aitken<br>Ealing, London, England |
| --- | --- | --- |
| [21] | Appl. No. | 736,208 |
| [22] | Filed | June 11, 1968 |
| [45] | Patented | Oct. 13, 1970 |
| [73] | Assignee | Paterson Candy International Limited<br>London, England |
| [32] | Priority | June 13, 1967 |
| [33] | | Great Britain |
| [31] | | No. 27,237/67 |

[54] GRANULAR FILTERS BACKWASH MEANS
4 Claims, 3 Drawing Figs.

[52] U.S. Cl. .................................................. 210/140,
210/274, 210/277, 210/412
[51] Int. Cl. ....................................................... B01d 23/24
[50] Field of Search .......................................... 210/19, 32,
35, 80, 82, 138, 139, 140, 274, 275, 277, 261, 349,
410, 412, 278, 279, 34

[56] References Cited
UNITED STATES PATENTS

| 1,088,929 | 3/1914 | Reisert ......................... | 210/275 |
| --- | --- | --- | --- |
| 1,871,122 | 8/1932 | Kretzschmar ................ | 210/274 |

FOREIGN PATENTS

| 235,474 | 2/1960 | Australia ..................... | 210/19 |
| --- | --- | --- | --- |
| 915,542 | 1/1963 | Great Britain ................ | 210/138 |
| 1,164,798 | 5/1958 | France ......................... | 210/275 |

Primary Examiner—Reuben Friedman
Assistant Examiner—Frank A. Spear, Jr.
Attorney—Holman, Glascock, Downing and Seebold

ABSTRACT: A granular filter having a backwash liquid which is pulsated by the cyclic introduction and removal of air from an air trap below the filter bed.

Patented Oct. 13, 1970

3,533,507

INVENTOR
ROBERT WILLIAM AITKEN
BY Blascock, Downing
& Seebold.
ATTORNEYS

GRANULAR FILTERS BACKWASH MEANS

The invention relates to filters of the kind in which a granular filter bed is disposed in a container above support means and means for collecting liquid filtered through the bed.

In the specification of British Pat. No. 966,394, there is described and claimed a method of cleansing a gravity filter of the kind in which a granular bed is disposed in a container above a floor incorporating means for distributing cleansing liquid passed upwardly through the bed, wherein an upward flow of cleansing liquid is passed through the filter bed at a rapidly pulsating rate, such that the filter bed is caused alternately to expand and contract by amounts which are insufficient to result in substantial quantities of the filter media being carried away with the dirt entrained in the cleansing liquid.

It has now been found that the above method of cleansing a filter is applicable not only to gravity filters but also to pressure filters.

Also, the specific constructions of filters described and illustrated in the abovementioned Pat. No. 966,394 disclose means for impelling the cleansing liquid upwardly comprising pulsating means including a reciprocating plunger diaphragm, or air vessel.

In accordance with the present invention there is provided a granular filter of the kind in which cleansing of the filter media is effected by the passage of cleansing liquid in the opposite direction to that in which the liquid to be filtered flows through the filter media, wherein the improvement comprises causing the cleansing liquid to pass through the media in a pulsating manner by the introduction to, and removal of, air cyclically from the area for supplying the cleansing liquids to the filter bed to such a degree as to periodically change the rate of flow of the cleansing liquid through the media.

The invention further consists in a granular filter as set forth in the preceding paragraph in which the cleansing liquid passes to the filter bed by way of an air trap, the trap being connected to a source of air under pressure and to atmosphere by valve means, by which air is introduced to the trap and is allowed to escape to atmosphere alternately, to produce pulsations of the cleansing liquids.

The accompanying drawing shows, by way of example only, two embodiments of the invention in which:

FIG. 2 is a part vertical section through the underdrain system of a filtering plant, while

Figure 1:
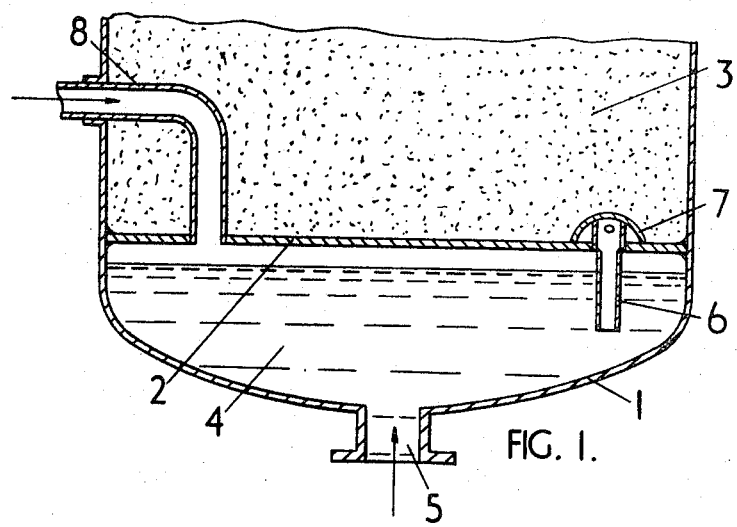
FIG. 1 is a part vertical section through a granular filter constructed in accordance with the invention.

FIG. 1 shows the lower part of a granular filter comprising an outer shell 1 which is divided horizontally by a nozzle plate 2, the media 3 being supported upon the nozzle plate. The liquid to be filtered is introduced to the shell above the media 3, and after filtering finds its way through the plate 2 by way of a number of nozzles, one of which is shown. The filtered liquid is collected on the space 4 below the plate, and passes out of the filter by way of the connection 5. The liquid may pass downwards through the media either by gravity, or a more rapid flow may be induced by fluid pressure.

Each nozzle comprises a tubular stem 6 which passes through the plate 2, and is surrounded by a hemispherical cap 7 provided with narrow radial slots which allow passage of the liquid without permitting entry of the media. To allow passage of the liquid into the stem 6 there are provided radial holes through the stem below the cap 7.

In order to carry out a cleansing operation in accordance with the invention there is provided an air pipe 8, which is connected on the one hand to a source of air under pressure, and to atmosphere alternately by valve means, and on the other hand is connected to the upper part of the collecting space 4. When a limited quantity of air is introduced into the space 4 it is trapped, and is unable to find its way into the upper part of the filter by reason of the downwardly projection of the stem 6.

By the cyclic introduction and removal of air from the collecting space 4 the rate of flow of the cleansing liquid through the nozzles varies. The length of time that air is admitted to the space 4 is adjusted so that the level of the liquid is depressed until air does not quite escape into the stem, while the length of time that air is exhausted is adjusted so that liquid does not enter the air pipe 8. The presence of air in the outflow liquid from the filter indicates that air is being fed to the collecting space for too long, and the presence of liquid in the exhaust to atmosphere indicates that the collecting space is being exhausted for too long.

It has been found that the air should be supplied to the collecting space at between 3 and 10 p.s.i., the steady flow being at 1 to 4 cubic feet per minute per square foot of filter bed area, while alternation of the air pressure should be in the region of 6 to 60 times per minute.

Seeing that the rate of flow of cleansing liquid through the filter is influenced by the change in momentum caused by the influx of the air, it is preferable to arrange for the air pressure to be applied as near to the bed as possible so that the maximum change in rate of flow through the bed is produced.

Figure 2:
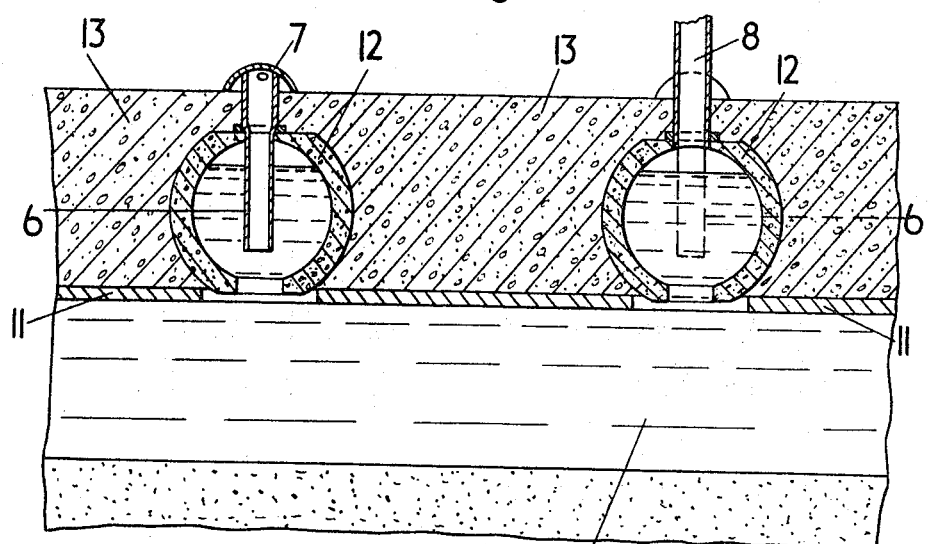

FIG. 2 shows part of the floor of a filter tank having water channels 10 formed therein, and which are covered with bridging strips 11. Across the channels are laid pipes 12, encased in concrete 13, and having nozzles 7, similar to those provided in FIG. 1, spaced along the pipes 12. Each pipe 12 is provided with an air pipe 8 by means of which air is introduced into the system, in the same manner as described for the construction of FIG. 1.

Figure 3:
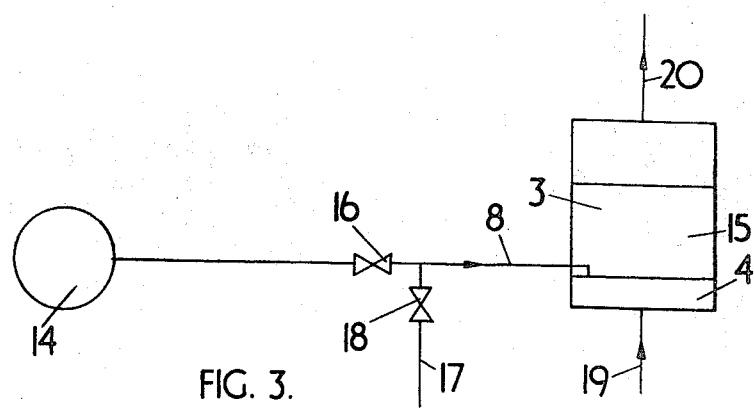
FIG. 3 is a diagrammatic representation of the air supply means.

There is shown diagrammatically in FIG. 3 one arrangement for feeding air to and withdrawing it from the air trap or traps, which comprise a source 14 of air under pressure, which is connected to the filter 15 by way of the valve 16, and an exhaust pipe 17, leading to atmosphere, which is controlled by the valve 18. During the cleansing process the cleansing liquid enters the filter 15 by the pipe 19 and leaves by the pipe 20.

The valves 16 and 18 can be operated electrically, mechanically, hydraulically or pneumatically as desired and are arranged to close and open so as to connect the filter alternately to the source of air 14 or the exhaust pipe 17. The controls of the valves may be manual or automatic when the filter is turned over to the cleansing cycle, while other details for carrying the invention into effect may be varied without departing from the scope of the invention.

I claim:

1. A granular filter of the type in which cleansing of the filter medium is effected by the passage of cleansing liquid in the opposite direction to that in which the liquid to be filtered flows through the filter medium, comprising a chamber, an inlet connection at the top of the chamber, and an outlet connection at the bottom of the chamber for the passage downwardly of liquid to be filtered through the chamber, a horizontal platform within the chamber dividing it into two parts, a granular filter medium in the upper part of the chamber supported upon said platform, a plurality of tubular nozzles each forming a passageway through said platform, said nozzles projecting below said platform and defining at least one air trap below said platform, supply means for supplying cleansing liquid to the bottom of said chamber, a source of air under pressure, a piped connection between said source of air and said bottom of said chamber and between said bottom of said chamber and atmosphere, and valve means in the said piped connections for connecting the upper part of said bottom of said chamber alternately to said source of air under pressure and to atmosphere, and power operated means for operating said valve means alternately and cyclically at a predetermined adjustable rate.

2. A granular filter as claimed in claim 1 in which said chamber is open above to atmosphere and said filter operates as a gravity filter.

3. A granular filter as claimed in claim 1 in which said chamber is closed and said filter operates as a pressure filter.

4. A granular filter as claimed in claim 1 in which said power operated means operate said valve means at a predetermined rate of between 6 and 60 times per minute.